(12) United States Patent
Shin

(10) Patent No.: US 11,472,228 B2
(45) Date of Patent: Oct. 18, 2022

(54) STRAP CENTER FIXED TYPE RESONATOR AND WHEEL ASSEMBLY COMPRISING THE SAME

(71) Applicants: Hyundai Motor Company, Seoul (KR); Kia Motors Corporation, Seoul (KR)

(72) Inventor: Sang-Min Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 503 days.

(21) Appl. No.: 16/660,558

(22) Filed: Oct. 22, 2019

(65) Prior Publication Data

US 2020/0148000 A1    May 14, 2020

(30) Foreign Application Priority Data

Nov. 14, 2018 (KR) .................. 10-2018-0139874

(51) Int. Cl.
  *B60B 1/00* (2006.01)
  *B60B 21/12* (2006.01)
  *G10K 11/172* (2006.01)
  *H04R 1/00* (2006.01)
(52) U.S. Cl.
  CPC ............ *B60B 21/12* (2013.01); *G10K 11/172* (2013.01); *B60B 2900/133* (2013.01)
(58) Field of Classification Search
  CPC .. B60B 21/12; B60B 2900/133; G10K 11/172

USPC ...................... 301/95.104; 381/337
See application file for complete search history.

(56) References Cited

U.S. PATENT DOCUMENTS

2018/0029425 A1    2/2018 Nourzad et al.
2021/0138848 A1*   5/2021 Kimura .................... B60C 1/00

FOREIGN PATENT DOCUMENTS

| JP | 2000-062408 A | 2/2000 |
| JP | 2009-214613 A | 9/2009 |
| KR | 10-2013-0097493 A | 9/2013 |
| WO | WO 2018/128134 A1 | 7/2018 |

OTHER PUBLICATIONS

Extended European Search Report dated Mar. 2, 2020 for European Patent Application No. 19209036.3.

* cited by examiner

*Primary Examiner* — Ammar T Hamid
(74) *Attorney, Agent, or Firm* — Morgan, Lewis & Bockius LLP

(57) ABSTRACT

A strap center fixed type resonator may include a resonator body configured to be mounted on a rim portion of a wheel supporting a tire; a resonating portion formed on a surface of the resonator body; and a strap inserting portion formed on a bottom internal surface of the resonating portion inside the resonating portion to allow a strap to be inserted in the strap inserting portion, wherein the strap is inserted into the strap inserting portion to fix the resonator body to the rim portion of the wheel.

16 Claims, 6 Drawing Sheets

STRAP CENTER FIXED TYPE RESONATOR AND WHEEL ASSEMBLY COMPRISING THE SAME

CROSS-REFERENCE(S) TO RELATED APPLICATIONS

The present application claims priority to Korean Patent Application No. 10-2018-0139874, filed on Nov. 14, 2018, the entire contents of which is incorporated herein for all purposes by this reference.

BACKGROUND OF THE DISCLOSURE

Field of the Disclosure

The present invention relates to a strap center fixed type resonator and a wheel assembly including the resonator, and more particularly, to a strap center fixed type resonator having a structure for fixing a center portion of the resonator using a strap and a wheel assembly including the resonator.

Description of Related Art

Generally, an aluminum wheel for a motor vehicle may include a horizontal body portion externally exposed and a rim portion formed integrally with the horizontal body portion to mount a tire thereon.

Since the tire mounted on the rim portion of the wheel for the motor vehicle continuously undergoes friction with the road surface during traveling of the vehicle, noise is inevitably generated inside the tire, and the present noise reflects between the internal surface of the tire and the rim and thus causes a resonance phenomenon.

Furthermore, the resonance phenomenon of the noise generated in the inside between the tire and the rim portion is transmitted as sound having a certain peak to the internal to the vehicle and the present causes internal noise.

Accordingly, as a result of such the resonance phenomenon of the noise, noise having a sharp peak is transmitted into an occupant compartment of the vehicle and thus the present causes a driver to feel uncomfortable. Furthermore, ride comfort deteriorates due to the continuous noise.

FIG. 1 is a schematic section diagram of a conventional resonator.

Referring to FIG. 1, to mount the conventional resonator, a dedicated wheel for mounting the resonator may be manufactured. To fix the conventional resonator 1 to the wheel, it is necessary to use a dedicated wheel having a wide width and a shape corresponding to the resonator, which is configured such that a protrusion 13 formed on one side of the resonator 1 having a resonating portion 12 is fixed to a fixing groove formed in the wheel and a strap guide 14 at the opposite side of the fixing groove is fixed to the wheel using a strap 15. Therefore, there is a problem that production cost increases and the number of assembling processes also increases.

Moreover, there is another problem in that there is a risk of damage to the resonator in the assembling process and strength of the wheel deteriorates due to formation of the fixing groove for fixing the resonator.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a strap center fixed type resonator and a wheel assembly including the present resonator, which have a simple structure and are configured for ensuring that the ease of assembly and manufacturing process are enhanced and strength is also enhanced while reducing weight.

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

In accordance with one aspect of the present invention, there is provided a strap center fixed type resonator including: a resonator body configured to be mounted on a rim portion of a wheel supporting a tire; a resonating portion formed on a surface of the resonator body; and a strap inserting portion formed on a bottom internal surface of the resonating portion inside the resonating portion to allow a strap to be inserted in the strap inserting portion wherein the strap is inserted into the strap inserting portion to fix the resonator body to the rim portion of the wheel.

The resonator body may have a shape extending in a circumferential direction thereof.

Width of the resonator body may have a dimension corresponding to the rim portion of the wheel.

The resonating portion may be configured such that a plurality of resonating portions are formed to be spaced from each other.

The resonating portion may be configured to form an internal space having a top surface having an arcuate shape.

A bottom portion of the resonating portion may be configured to prevent slip in a width direction of the resonating portion with respect to a vertical section.

The strap inserting portion may be formed at a center portion of a bottom internal surface of the resonating portion.

The strap inserting portion may have a shape elongated with respect to the vertical section.

The strap inserting portion can prevent slip in a radial direction thereof.

A plurality of nozzles may be formed on the resonator body in front of the resonating portion.

The plurality of nozzles may be formed with the strap interposed therebetween.

The nozzle may have a shape elongated with respect to the vertical section.

The strap may have a shape extending in a circumferential direction thereof.

In accordance with another aspect of the present invention, there is provided a wheel assembly including: a tire; a wheel on which the tire is mounted; and a strap center fixed type resonator including a resonator body configured to be mounted on a rim portion of the wheel supporting the tire, a resonating portion formed on a surface of the resonator body and a strap inserting portion formed on a bottom internal surface of the resonator to allow a strap to be inserted in the strap inserting portion.

The strap center fixed type resonator and the wheel assembly including the resonator according to an exemplary embodiment of the present invention provide advantageous effects that strength of the wheel is enhanced, noise, vibration and harshness (NVH) performance is improved and assemblability and manufacturing process are enhanced and at the same time the cost and weight may be reduced thanks to a simple structure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
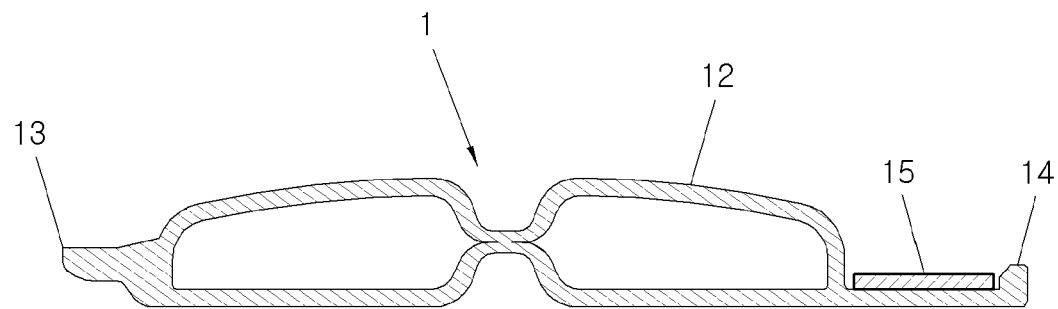
FIG. 1 is a schematic section diagram of a conventional resonator.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

It is to be understood that when a component is referred to as being coupled or connected to the other component, it may be directly coupled or connected to the other component but there may be another component interposed therebetween.

The term "connection" as used herein includes direct connection and indirect connection between a member and another member and may mean all physical connections such as adhesion, attachment, fastening, bonding and coupling.

Furthermore, the expressions such as "first," "second," etc. Are used only to distinguish a plurality of components but not limit the order of the components or other features.

Singular expressions include plural expressions unless the context clearly indicates otherwise. The term "comprising" or "having" is directed to mean that there are features, numbers, steps, operations, components, parts, or combinations thereof described in the specification, and it may be interpreted that one or more other features, numbers, steps, operations, components, parts, or combinations thereof may be added thereto.

Figure 2:
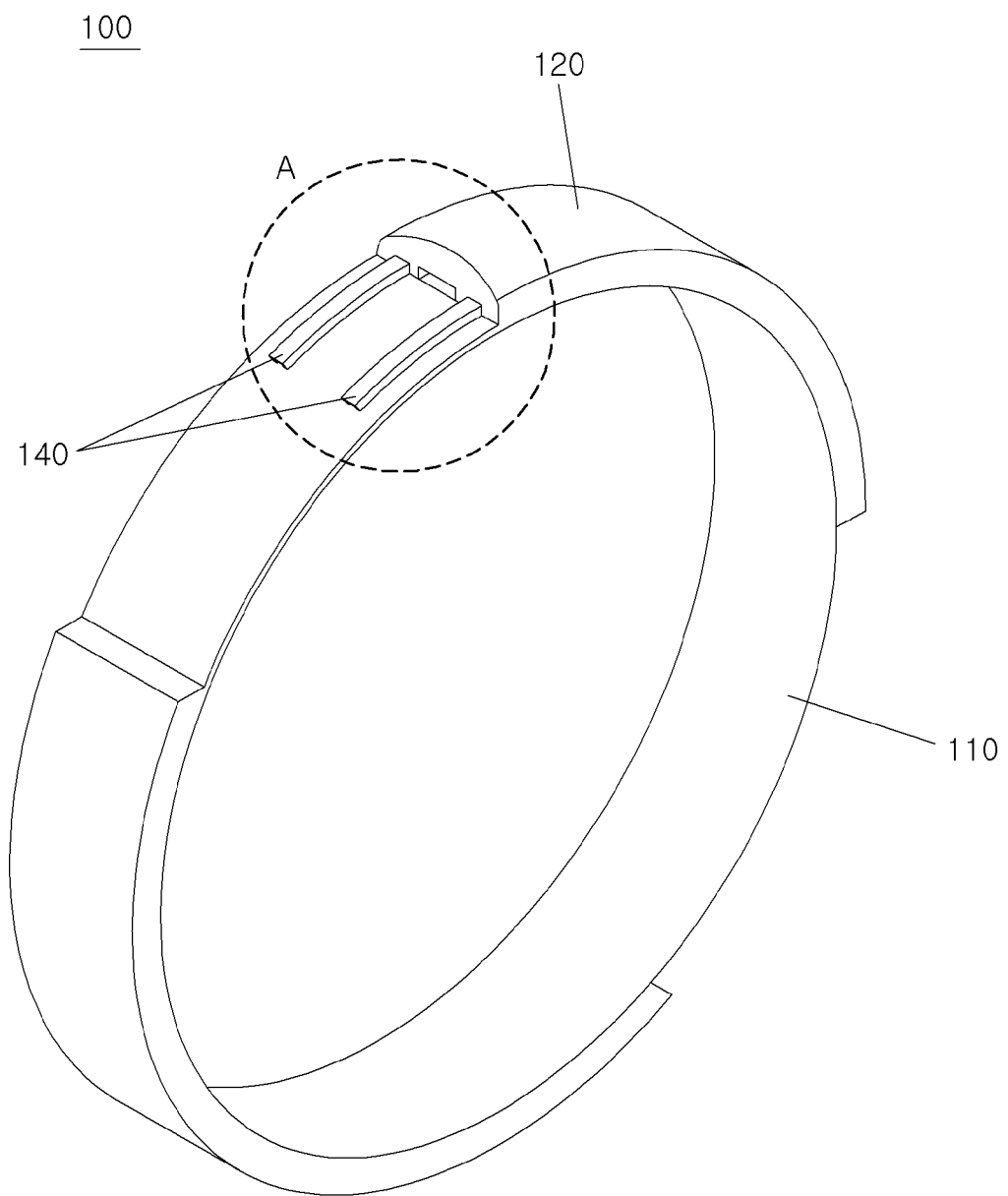
FIG. 2 is a perspective view of a strap center fixed type resonator according to an exemplary embodiment of the present invention.
Figure 3:
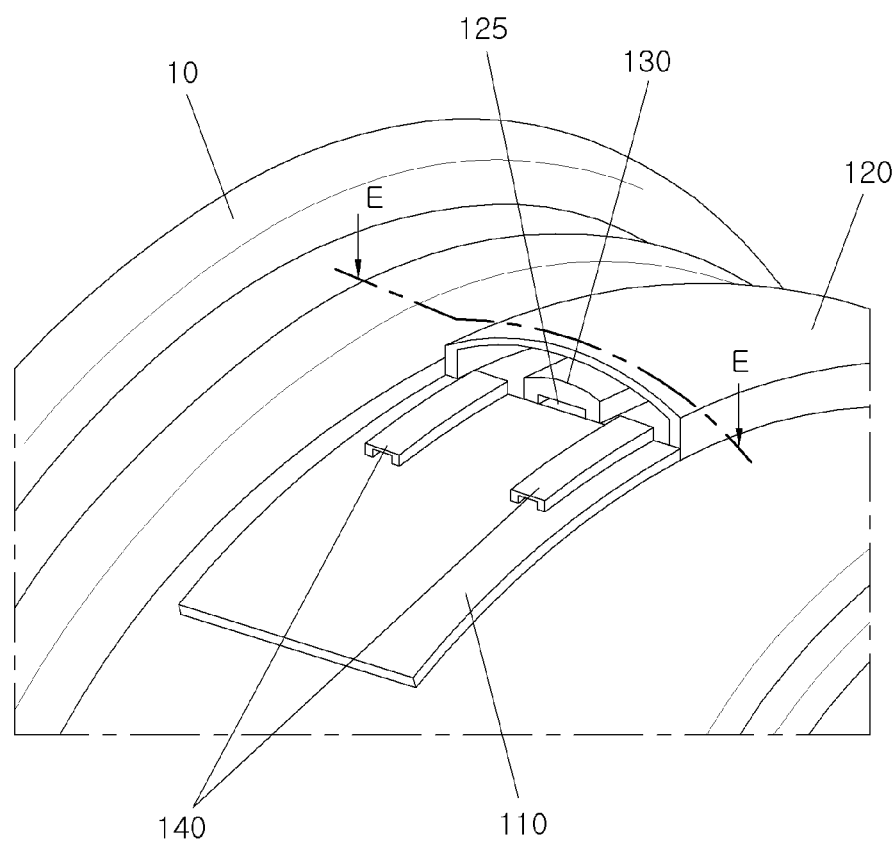
FIG. 3 is a diagram showing a portion A in FIG. 2 of a strap center fixed type resonator according to an exemplary embodiment of the present invention.
Figure 4:
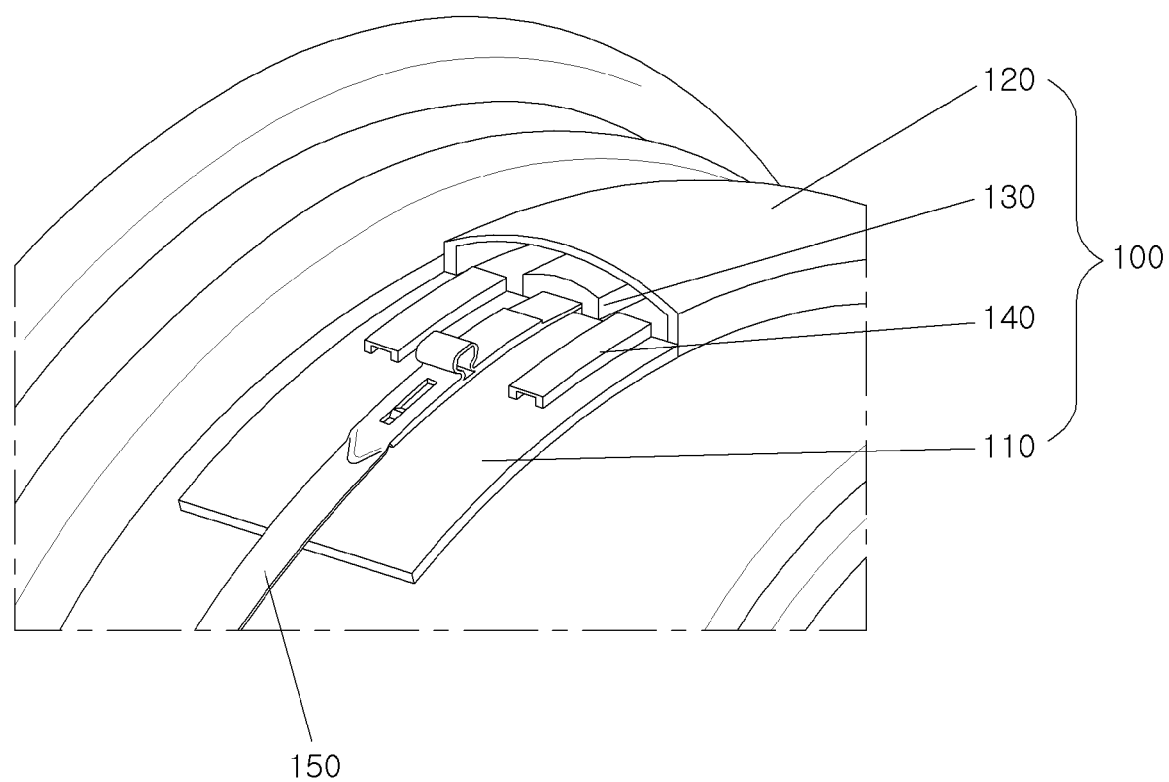
FIG. 4 is a diagram illustrating a state that a strap is fastened to a strap center fixed type resonator according to an exemplary embodiment of the present invention.

FIG. 2 is a perspective view of a strap center fixed type resonator according to an exemplary embodiment of the present invention, FIG. 3 is a diagram showing a portion an in FIG. 2 of the strap center fixed type resonator according to an exemplary embodiment of the present invention and FIG. 4 is a diagram illustrating a state that a strap is fastened to the strap center fixed type resonator according to an exemplary embodiment of the present invention.

Referring to FIGS. 1 to 4, a strap center fixed type resonator 100 according to an exemplary embodiment of the present invention includes a resonator body 110 to be mounted on a rim portion 11 of a wheel 10 supporting a tire; a resonating portion 120 formed on a top surface of the resonator body 110; and a strap inserting portion 130 formed on a bottom internal surface of the resonating portion 120 to allow a strap 150 to be inserted therein wherein the strap 150 is inserted into the strap inserting portion 130 to fix the resonator body 110 to the rim portion 11 of the wheel 10.

In an exemplary embodiment of the present invention, the strap inserting portion 130 includes a mounting hole 125 through which the strap 150 is mounted.

In an exemplary specific embodiment, the resonator body 110 is of a shape extending in a circumferential direction and width of the resonator body 110 preferably has a dimension corresponding to the rim portion 11 of the wheel 10.

The resonating portion 120 is configured such that a plurality of resonating portions are formed to be spaced from each other in the resonating portion. The resonating portion is shown in the figure as being two but is not limited thereto.

Referring to the enlarged view of the portion A, internal structure of the resonator will be described in detail. The resonating portion 120 forms an internal space of which top surface has an arcuate shape. Furthermore, a bottom portion of the resonating portion 120 is configured to prevent slip in a width direction of the resonating portion with respect to a vertical section.

In the present structure, the strap inserting portion 130 is formed at a center portion of a bottom internal surface of the resonating portion 120. The strap inserting portion 130 is configured such that a space for allowing the strap 150 to be inserted therein has a shape elongated with respect to the vertical section thereof.

The strap 150 has a configuration extending circumferentially. The strap 150 is coupled to the strap inserting portion 130 to prevent the strap center fixed type resonator 100 from slipping radially.

On the other hand, a plurality of nozzles 140 are formed on the resonator body 110 in front of the resonating portion 120. The plurality of nozzles 140 are formed with the strap 150 interposed therebetween. In the instant case, the nozzle 140 preferably has a shape elongated with respect to the vertical section.

Figure 5:
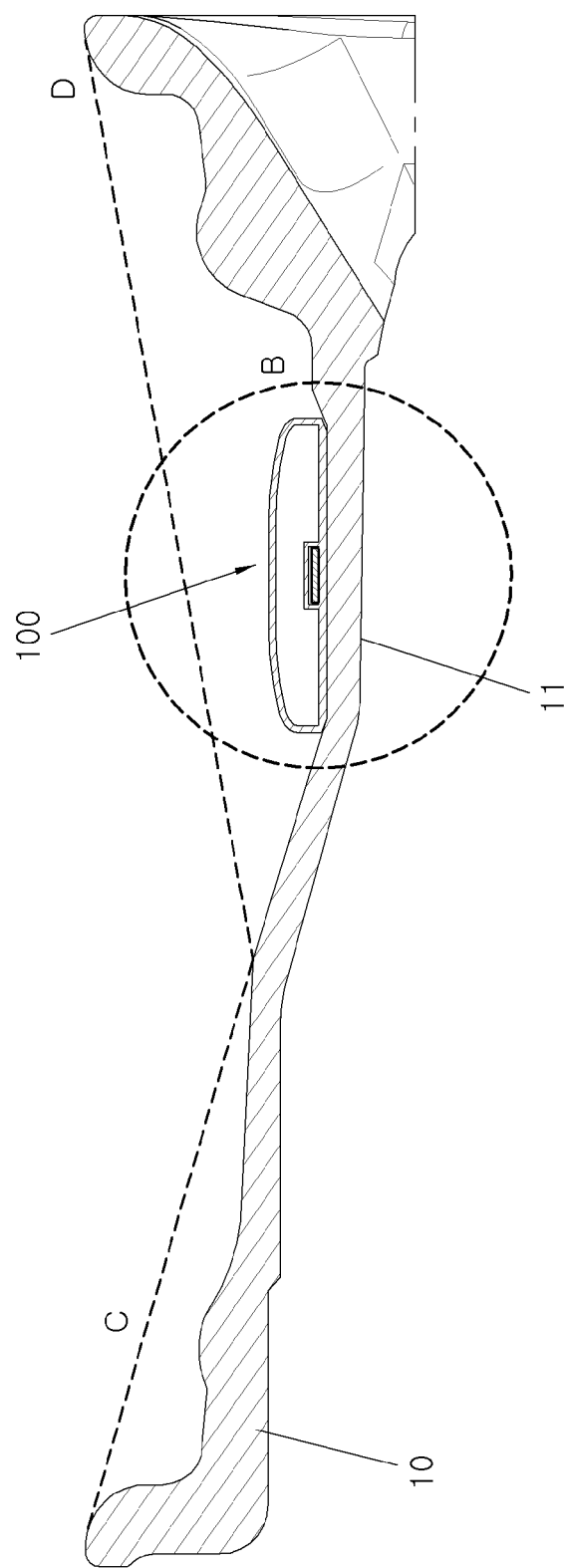
FIG. 5 is a cross-sectional diagram taken along the line E-E in FIG. 3.
Figure 6:
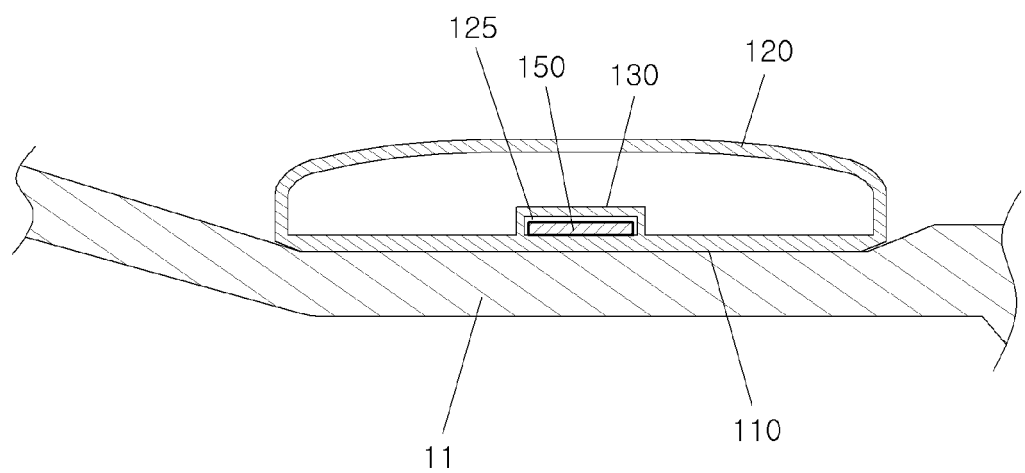
FIG. 6 is a partial enlarged diagram of a portion B in FIG. 5.

FIG. 5 illustrates the strap center fixed type resonator 100 to be mounted on the rim portion 11 of the wheel 10 with reference to the section taken along the line E-E of FIG. 3. FIG. 6 is a partial enlarged view of a portion B.

Referring to FIG. 5 and FIG. 6 together with FIG. 2, FIG. 3 and FIG. 4, operating relationship of the strap center fixed type resonator 100 according to an exemplary embodiment of the present invention will be described below. The strap center fixed type resonator 100 includes a resonator body 110 to be mounted on a rim portion 11 of a wheel 10 supporting a tire; a resonating portion 120 formed on a top surface of the resonator body 110; and a strap inserting portion 130 formed on a bottom internal surface of the resonating portion 120 to allow a strap 150 to be inserted therein wherein the strap 150 is inserted into the strap inserting portion 130 to fix the resonator body 110 to the rim portion 11 of the wheel 10.

In other words, the strap 150 is inserted and fixed in the strap inserting portion 130 and therefore the bottom portion of the resonating portion 120 of the strap center fixed type resonator 100 prevents slip in the width and radial directions with respect to the vertical section.

Furthermore, as may be seen through lines C and D, when a breakaway guide jig enters the internal to the wheel, there is no contact with the resonator so that the resonator is not damaged.

Generally, the resonator is a device formed in a shape of a closed space having small holes or spouts. When a standing wave generated in an adjustment chamber enters the resonator, it is converted into vibration in a form of a new reverse phase changed from the waveform of the standing wave and is output out of the resonator. Therefore, a phase shift occurs for a specific frequency and thus a specific standing wave in the adjustment chamber is extinguished.

Consequently, with the configuration as described above, the strap center fixed type resonator and the wheel assembly provide advantageous effects that strength of the wheel is enhanced, NVH performance is improved and the ease of assembly and manufacturing process are enhanced and at the same time the cost and weight may be reduced Tanks to a simple structure.

Moreover, the resonator may be applied to a conventional general wheel. Also, since a reinforcing portion for increasing rigidity in the related art is eliminated, reduction of cost and weight may be achieved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A resonator apparatus comprising:
a resonator body configured to be mounted on a rim portion of a wheel supporting a tire;
a resonating portion formed on a surface of the resonator body; and
a strap inserting portion formed on a bottom internal surface of the resonating portion inside the resonating portion to allow a strap to be inserted in the strap inserting portion,
wherein the strap is inserted into the strap inserting portion to fix the resonator body to the rim portion of the wheel, and
wherein at least a nozzle is formed on the resonator body in a front of the resonating portion.

2. The resonator apparatus according to claim 1, wherein the resonator body is of a shape extending in a circumferential direction of the rim portion.

3. The resonator apparatus according to claim 1, wherein width of the resonator body has a dimension corresponding to the rim portion of the wheel.

4. The resonator apparatus according to claim 1, wherein the resonating portion is configured such that a plurality of resonating portions are formed to be spaced from each other.

5. The resonator apparatus according to claim 1, wherein the resonating portion is configured to form an internal space having a top surface having an arcuate shape.

6. The resonator apparatus according to claim 1, wherein a bottom portion of the resonating portion is configured to prevent slip in a width direction of the resonating portion with respect to a vertical section.

7. The resonator apparatus according to claim 1, wherein the strap inserting portion is formed at a center portion of the bottom internal surface of the resonating portion.

8. The resonator apparatus according to claim 1, wherein the strap inserting portion includes a mounting hole through which the strap is mounted.

9. The resonator apparatus according to claim 1, wherein the strap inserting portion is of a shape elongated with respect to a vertical section.

10. The resonator apparatus according to claim 1, wherein the strap inserting portion is configured to prevent slip in a radial direction thereof.

11. The resonator apparatus according to claim 1, wherein the at least a nozzle includes more than two nozzles and the strap is interposed between the more than two nozzles.

12. The resonator apparatus according to claim 1, wherein the at least a nozzle is of a shape elongated with respect to a vertical section.

13. The resonator apparatus according to claim 1, wherein the strap is of a shape extending in a circumferential direction of the rim portion.

14. A wheel assembly comprising:
a tire;
a wheel on which the tire is mounted; and
a resonator apparatus including:
a resonator body configured to be mounted on a rim portion of the wheel supporting the tire,
a resonating portion formed on a surface of the resonator body; and
a strap inserting portion formed on a bottom internal surface of the resonating portion in the resonating portion to allow a strap to be inserted in the strap inserting portion,
wherein at least a nozzle is formed on the resonator body in a front of the resonating portion.

15. The wheel assembly according to claim 14, wherein the strap inserting portion includes a mounting hole through which the strap is mounted.

16. The wheel assembly according to claim 14, wherein the at least a nozzle includes more than two nozzles and the strap is interposed between the more than two nozzles.

* * * * *